G. W. JONES.
BASKET HANDLE.
APPLICATION FILED MAY 18, 1912.

1,033,704.

Patented July 23, 1912.

Witnesses
Carroll Bailey
P. M. Smith

Inventor
George W. Jones,
By Victor J. Evans
Attorney

UNITED STATES PATENT OFFICE.

GEORGE W. JONES, OF CANANDAIGUA, NEW YORK, ASSIGNOR TO MICHAEL J. MANEY, OF GENEVA, NEW YORK.

BASKET-HANDLE.

1,033,704.  Specification of Letters Patent.  Patented July 23, 1912.

Application filed May 18, 1912. Serial No. 698,217.

*To all whom it may concern:*

Be it known that I, GEORGE W. JONES, a citizen of the United States, residing at Canandaigua, in the county of Ontario and State of New York, have invented new and useful Improvements in Basket-Handles, of which the following is a specification.

This invention relates to handles for baskets and the like, the object in view being to provide an efficient and reliable combined carrying handle and cover fastener, whereby a cover may be held securely upon the basket or other receptacle, while it is being handled.

A further object of the invention is to provide a device of the character mentioned which will be devoid of any sharp points, apt to catch in the clothing or injure the hands of the person carrying the basket, and which will enable the contents to be readily removed or inserted, without inconvenience.

With the above and other objects in view, the invention consists in the construction, combination and arrangement of parts, as will be hereinafter more fully described, illustrated in the accompanying drawings, and pointed out in the claim hereunto appended.

Figure 1:
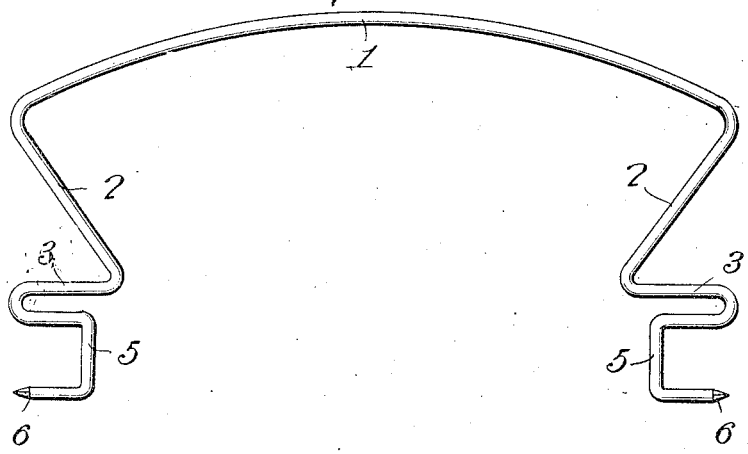
Figure 2:
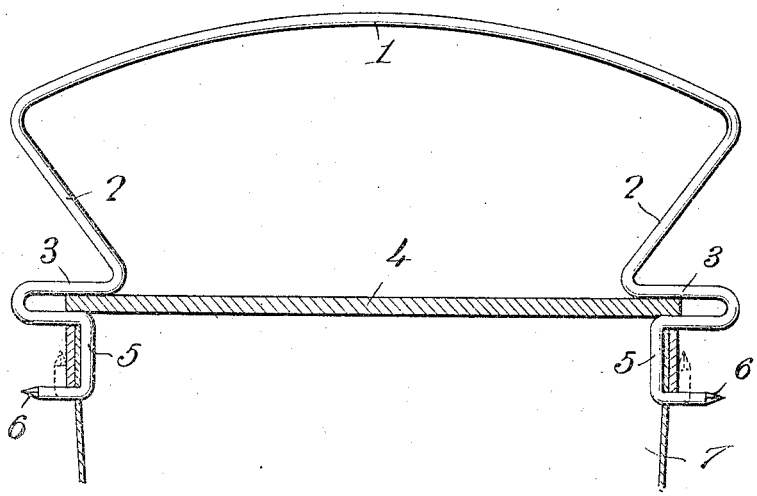

In the drawings: Figure 1 is a view in elevation of the handle detached. Fig. 2 is a sectional view of a basket and cover, showing the relation of the improved handle thereto.

The handle contemplated in this invention is formed out of a single length of spring wire, the central portion of which is bent on an arc of a large radius to form an arched hand grip portion 1. After the formation of the grip 1, the end portions of the wire are bent downward and inward toward each other, to form the converging sides 2. The end portions of the wire are then bent outwardly and recurved upon themselves inwardly, to form the oppositely located cover holding loops 3, which are open at their inner sides, so as to engage over the opposite edges of a suitable cover, indicated at 4, for the basket or other receptacle to which the handle is attached. After the formation of the cover holding loops 3, the end portions of the wire are extended downward, as shown at 5, and then bent directly outward, as shown, and sharpened at their points, so as to enable such pointed terminals 6 to be thrust outward through the opposite sides of the basket or receptacle, from the inside thereof. These pointed terminals may be subsequently clenched against the outside of the basket or receptacle, indicated at 7.

In the preferred embodiment of the invention, the vertical portions 5 are made of sufficient length to enable the rim of the basket to be embraced and confined between the pointed terminals and the cover holding loops. This gives a secure hold upon the basket or receptacle. It will also be observed that the handle obtains a direct hold upon the basket or receptacle itself, and thereby relieves any strain upon the cover which is frequently fragile and not capable of sustaining the strain. This enables a very light cover to be used.

What is claimed is:

A combined carrying handle and cover fastener, consisting of a single length of wire bent to form a bail-shaped handle proper, outwardly extending pointed terminals, and outwardly extending cover receiving loops between the handle and its terminals, said loops being open at their inner sides to admit the opposite edges of the cover.

In testimony whereof I affix my signature in presence of two witnesses.

GEORGE W. JONES.

Witnesses:
 WM. J. HUNT,
 LUCY FOSTER.